Jan. 2, 1968   M. S. FRANK   3,361,484
CAST NON-FERROUS WHEEL WITH WELDED FERROUS TIRE RIM
Filed Sept. 24, 1965   2 Sheets-Sheet 1

INVENTOR.
Max S. Frank
BY Robert C. Comstock
Attorney

INVENTOR.
Max S. Frank
BY Robert C. Constant
Attorney

United States Patent Office 3,361,484
Patented Jan. 2, 1968

3,361,484
CAST NON-FERROUS WHEEL WITH WELDED FERROUS TIRE RIM
Max S. Frank, West Los Angeles, Calif., assignor to Shore-Calnevar, Inc., Paramount, Calif., a corporation of California
Filed Sept. 24, 1965, Ser. No. 489,993
2 Claims. (Cl. 301—65)

ABSTRACT OF THE DISCLOSURE

An automobile wheel formed of non-ferrous material having an integrally molded continuous circular band of ferrous material, to which a ferrous tire rim is welded continuously around the entire periphery of the wheel.

The wheel has a plurality of radial spokes with open areas between them through which portions of the inner periphery of the wheel are exposed. These portions must have a substantially smooth surface, which is secured by providing an arcuate air gap between the reinforcing member in each of the exposed portions, to prevent chilling of the exposed portions caused by the temperature differential between the molten casting metal and the pre-formed reinforcing member.

---

This invention relates to a wheel for automotive vehicles.

A wheel which is formed of cast aluminum or similar non-ferrous material offers many advantages, but it also has certain disadvantages. One of its principal disadvantages is the difficulty of securing it to the tire rim. It cannot feasibly be welded and other types of fastening are unsatisfactory either because of excessive cost, looseness due to vibration or other reasons.

It is accordingly among the objects of this invention to provide a cast wheel central section which is capable of being welded to a ferrous tire rim around its entire periphery. In essence, the invention contemplates incorporating into the wheel section at the time it is cast a continuous ring of ferrous material which is so oriented that it provides a continuous band of ferrous material extending around the entire periphery of the wheel section, directly adjacent to the tire rim. The tire rim can then be welded to such band around the entire periphery of the wheel section.

Another disadvantage of a wheel section which is cast from non-ferrous material is that it is structurally weak compared to ferrous materials. It is accordingly among the objects of this invention to provide a wheel section in which the above described ring of ferrous material also acts as a strengthening member to reinforce the entire wheel and to assure its proper concentricity.

One problem which arises in incorporating a previously formed reinforcing member into a casting is that the temperature differential between the reinforcing member and the molten casting material is so great that the reinforcing member tends to "chill" the molten metal and cause a surface area adjacent to the chilling which is rough and uneven, rather than smooth. This is particularly undesirable in the areas of the wheel which are visible in use. Such visible areas should preferably have a so-called "hardware" finish which requires little buffing or polishing.

It is accordingly a further object of the present invention to provide means for incorporating a reinforcing member into a cast wheel section while at the same time maintaining a smooth, perfectly cast surface without undesirable chilling occurring, particularly in the exposed surface areas. This is accomplished by interposing a portion of the heated mold between the reinforcing member and the exposed surface of the wheel section to prevent chilling of the exposed surface area by the reinforcing member.

Another problem which arises in casting a wheel section with a continuous ring reinforcing member is the problem of holding and orienting the reinforcing member before and during the casting operation. It is another object of this invention to provide means for orienting and holding the reinforcing member in its proper position before and during the casting operation.

My invention also comprises such other objects, advantages and capabilities as will later more fully appear and which are inherently possessed by my invention.

While I have shown in the accompanying drawings a prefererd embodiment of my invention, it should be understood that the same is susceptible of modification and change without departing from the spirit of my invention.

Referring to the drawings.

Figure 9:
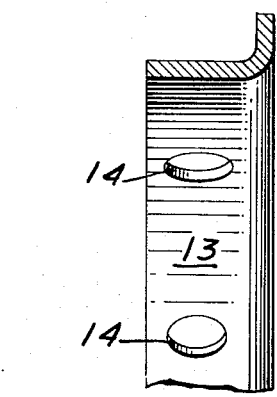
FIG. 9 is a sectional view of the reinforcing member, taken along line 9—9 of FIG. 8.

A preferred embodiment which has been selected to illustrate my invention comprises a wheel 10 having a nave 11 and spokes 12, all of which are preferably cast of non-ferrous material such as aluminum or the like. Extending around the entire periphery of the wheel 10 is a circular reinforcing member 13, which is preferably formed of ferrous material such as steel or the like. The reinforcing member 13 is preferably L-shaped in cross section, as shown in FIG. 9 of the drawings, and has a plurality of spaced openings 14 extending through it which provide a better bond between the reinforcing member 13 and the wheel 10.

Figure 1:
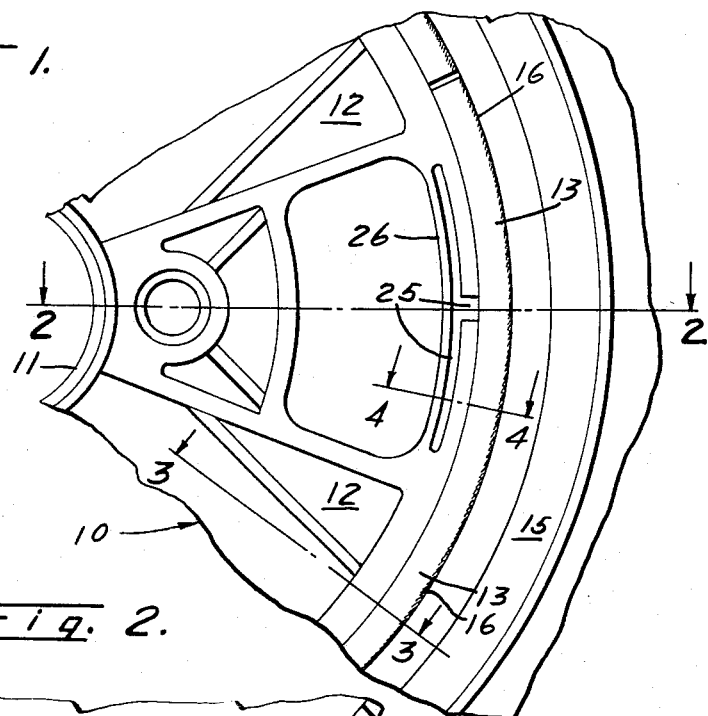
FIG. 1 is a rear elevational view of a section of an automotive wheel formed in accordance with the present invention.
Figure 2:
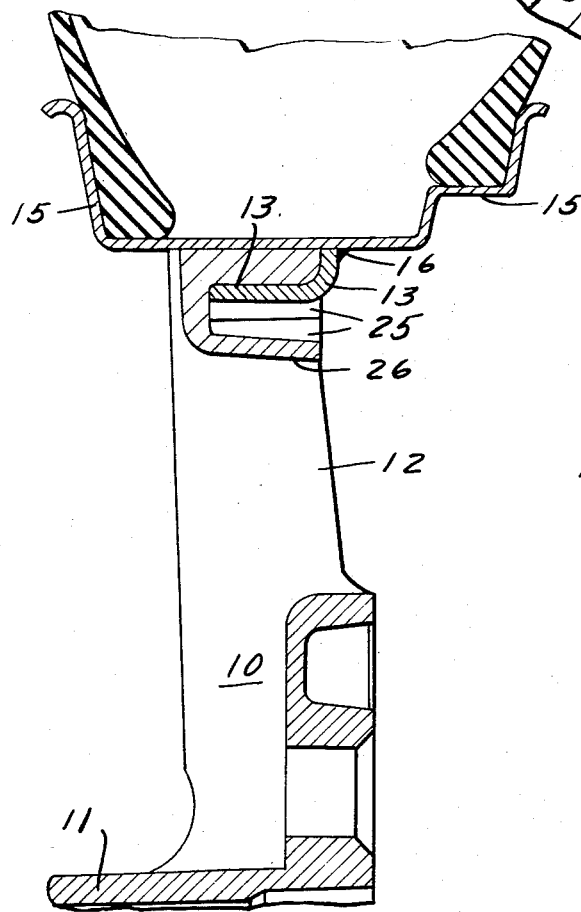
FIG. 2 is a sectional view of the same, taken along line 2—2 of FIG. 1.
Figure 3:
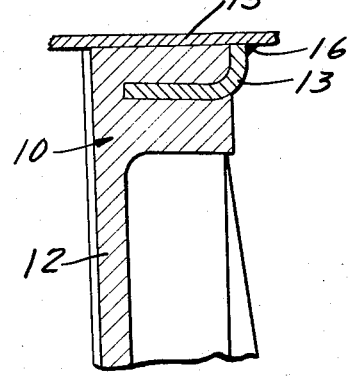
FIG. 3 is a sectional view of the same, taken along line 3—3 of FIG. 1.
Figure 4:
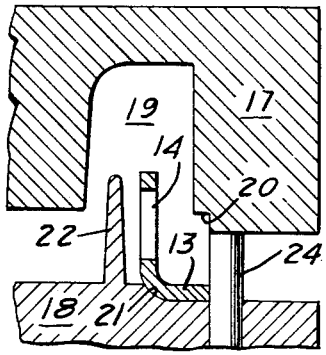
FIG. 4 is a sectional view of the mold in open position, with the reinforcing member disposed therein, showing the formation of the mold which forms the portion of the wheel disposed along line 4—4 of FIG. 1.

As shown in FIGS. 2 and 3 of the drawings, the reinforcing member 13 is disposed directly adjacent to the steel tire rim 15, so that a continuous weld 16 can be provided around the entire periphery of the wheel 10. This provides a strong and permanent connection between the wheel 10 and the rim 15. The tire is held within the rim 15.

The method of making the wheel 10 and the method of holding the reinforcing member 13 in place before and during the molding operation are shown in FIGS. 4-7, inclusive, of the drawings. The wheel is cast in a two-part mold comprising a female part 17 and a male part 18. The female part 17 is provided with a main opening 19, adjacent one corner of which is a step 20.

The male part 18 is provided with an arcuate portion 21, which is adapted to receive and seat the curved corner portion of the reinforcing member 13. The male part 18 is also provided with an upright portion 22, which is somewhat shorter in length than the depth of the opening 19 in the female part 17.

Figure 6:
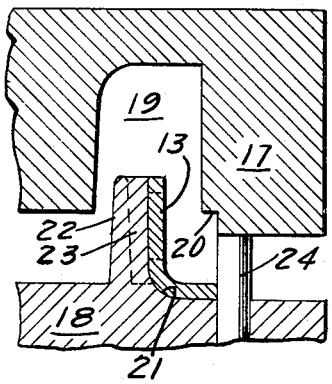
FIG. 6 is a sectional view of the mold in open position, with the reinforcing member disposed therein, showing the formation of the mold which forms the portion of the wheel along line 2—2 of FIG. 1.
Figure 5:
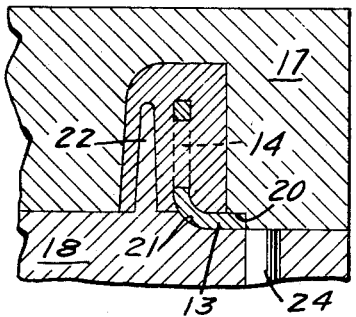
FIG. 5 is a sectional view of the same portion of the mold in closed position and filled.
Figure 7:
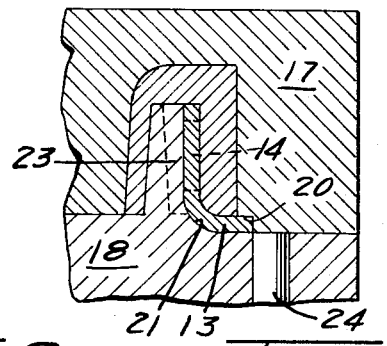
FIG. 7 is a sectional view of the same portion of the mold in closed position and filled.
Figure 8:
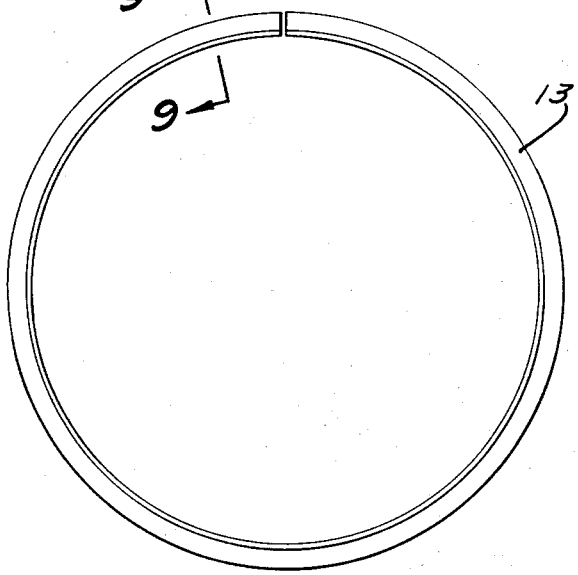
FIG. 8 is a top plan view of the reinforcing member.

The male part 18 is also provided with a plurality of spaced locator pads 23, which form integral extensions of the upright portions 22. As shown in FIG. 6 of the drawings, the locator pads 23 extend between the upright portions 22 and the reinforcing member 13.

The male part 18 also carries a pluralitty of spaced locator pins 24, which are normally urged toward the female part 17 by resilient or hydraulic means (not shown in the drawings). The locator pins 24 are mounted for reciprocal movement along their longitudinal axes and are retracted when the mold is closed by bringing the parts 17 and 18 together.

It will be seen that the reinforcing member 13 is located in the male part 18 of the mold, with its curved corner portion resting in the arcuate portion 21, and with one side engaging the locator pads 23 and one edge engaging the locator pins 24. The reinforcing member 13 is thus securely held in place when the mold is in open position.

When the mold is closed, the locator pins 24 are retracted, but the edge of the reinforcing member 13 which was disposed adjacent to the locator pins 24 is held within the step 20 in the female part 17. The reinforcing member 13 is thus held in its proper position during the casting operation.

It will also be noted that the upright portion 22 of the male part 18, which is normally heated along with the entire mold, is interposed between the reinforcing member 13 and the outer surface of the wheel. This prevents any chilling of the cast metal from marring the outer surface of the wheel. If any chilling occurs, it will occur along the air gap 25 which is disposed between the reinforcing member 13 and the outer surface of the wheel.

The upright portions 22 need be provided only along the portions of the wheel where the cast metal is relatively thin. In such areas, chilling is most likely to occur and mar the exposed surface by causing the cast metal to pull away from the mold and form a rough, uneven surface which is difficult and expensive to polish out because of the irregular contour of the wheel.

It will be noted that the reinforcing member 13 provides a continuous ring which extends around the entire periphery of the wheel in order to strengthen its thinner and weaker portions.

The locator pins 24 may also serve an added purpose by engaging overflow portions of the cast wheel in order to help eject the parts from the mold.

After the wheel has been removed from the mold, the edge of the reinforcing member which was disposed within the step 20 protrudes somewhat beyond the edge of the wheel 10. This protruding portion is preferably machined off before the wheel 10 is attached to the rim 15.

I claim:

1. A wheel for automotive vehicles, said wheel being formed of cast aluminum material, said wheel having molded therein a circular reinforcing member formed of ferrous material, said reinforcing member having a plurality of spaced openings through which said aluminum material extends, said reinforcing member being substantially L-shaped in cross section, one end of said reinforcing member extending into said wheel and the other end thereof extending transversely to the outer periphery of said wheel adjacent one edge thereof, a ferrous tire rim welded to said last named end of said reinforcing member continuously around the entire outer periphery of said wheel, said wheel having a plurality of radial spokes with open areas between said spokes through which portions of the inner periphery of said wheel are exposed, and an arcuate air gap disposed between said reinforcing member and each of said exposed portions, said exposed portions of said wheel having a substantially smooth surface.

2. A wheel for automotive vehicles, said wheel being formed of cast non-ferrous material, said wheel having molded therein a circular reinforcing member formed of ferrous material, said reinforcing member having a portion thereof extending adjacent to the outer periphery of said wheel, a ferrous tire rim welded to said portion of said reinforcing member continuously around the entire outer periphery of said wheel, said wheel having a plurality of radial spokes with open areas between said spokes through which portions of the inner periphery of said wheel are exposed, and an arcuate air gap disposed between said reinforcing member and each of said exposed portions, said exposed portions of said wheel having a substantially smooth surface.

References Cited

UNITED STATES PATENTS

| | | | |
|---|---|---|---|
| 2,008,933 | 7/1935 | Sinclair | 301—65 |
| 2,164,883 | 7/1939 | Moore | 301—6 |
| 2,336,767 | 12/1943 | Ash | 301—36 X |
| 2,439,881 | 4/1948 | Ash | 301—65 |
| 3,250,571 | 5/1966 | Richter | 301—67 X |
| 3,250,572 | 5/1966 | Walker | 301—67 X |

FOREIGN PATENTS

| | | |
|---|---|---|
| 387,086 | 2/1933 | Great Britain. |

RICHARD J. JOHNSON, *Primary Examiner.*

BENJAMIN HERSH, *Examiner.*